US012621138B2

(12) United States Patent
Duval et al.

(10) Patent No.: US 12,621,138 B2
(45) Date of Patent: May 5, 2026

(54) METHOD FOR GENERATING AN INDEPENDENT BIT SEQUENCE

(71) Applicant: THALES DIS FRANCE SAS, Meudon (FR)

(72) Inventors: Benjamin Duval, Saint Maximin (FR);
Olivier Fourquin, Fuveau (FR);
Yannick Teglia, Belcodene (FR)

(73) Assignee: THALES DIS FRANCE SAS, Meudon (FR)

( * ) Notice: Subject to any disclaimer, the term of this patent is extended or adjusted under 35 U.S.C. 154(b) by 38 days.

(21) Appl. No.: 18/715,748

(22) PCT Filed: Dec. 2, 2022

(86) PCT No.: PCT/EP2022/084163
§ 371 (c)(1),
(2) Date: Jun. 3, 2024

(87) PCT Pub. No.: WO2023/099714
PCT Pub. Date: Jun. 8, 2023

(65) Prior Publication Data
US 2025/0047478 A1 Feb. 6, 2025

(30) Foreign Application Priority Data
Dec. 3, 2021 (EP) .................................... 21306707

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01)

(58) Field of Classification Search
USPC .......................................................... 380/46
See application file for complete search history.

(56) References Cited

U.S. PATENT DOCUMENTS

| | | | | |
|---|---|---|---|---|
| 4,853,884 | A | * 8/1989 | Brown | G06F 7/588 |
| | | | | 708/250 |
| 2004/0019619 | A1 | * 1/2004 | Buer | H04L 9/0869 |
| | | | | 708/254 |
| 2014/0184349 | A1 | * 7/2014 | Muljono | H03K 7/02 |
| | | | | 332/115 |
| 2018/0019988 | A1 | * 1/2018 | Li | H04L 63/205 |

FOREIGN PATENT DOCUMENTS

EP 2994826 A1 3/2016

OTHER PUBLICATIONS

XP080253817—Sep. 6, 2006—arxiv.org, Cornell University Library, 201 Olin Library Cornell University Ithaca, NY 14853 Relevant to section "Theory of operation: the restartable clock method".
International Search Report (PCT/ISA/220) and Written Opinion (PCT/ISA/237) mailed on Mar. 14, 2023, by the European Patent Office as the International Searching Authority for current International Application No. PCT/EP2022/084163 [15 pages].

* cited by examiner

*Primary Examiner* — Sanchit K Sarker

(57) ABSTRACT

Provided is a method for generating, by a random number generator of a cryptographic system, an independent bit sequence from a binary candidate random stream, said random generator comprising a source of randomness configured to generate a random noise, an analog to digital converter configured to generate a binary raw random stream by digitizing said random noise, said candidate random stream being obtained from said raw random stream. Other embodiments disclosed.

6 Claims, 3 Drawing Sheets

Cryptographic system 100

Random number generator 101

| Source of randomness 102 | Random noise | Analog to Digital converter 103 | raw random stream | Undersampling unit 110 | Candidate random stream | Postprocessing 109 | independent bit sequence |

Input/Output Interface 108

Communication Interface 107

ROM 106

NVM 104

Random Number Generator 101

RAM 105

Fig. 3

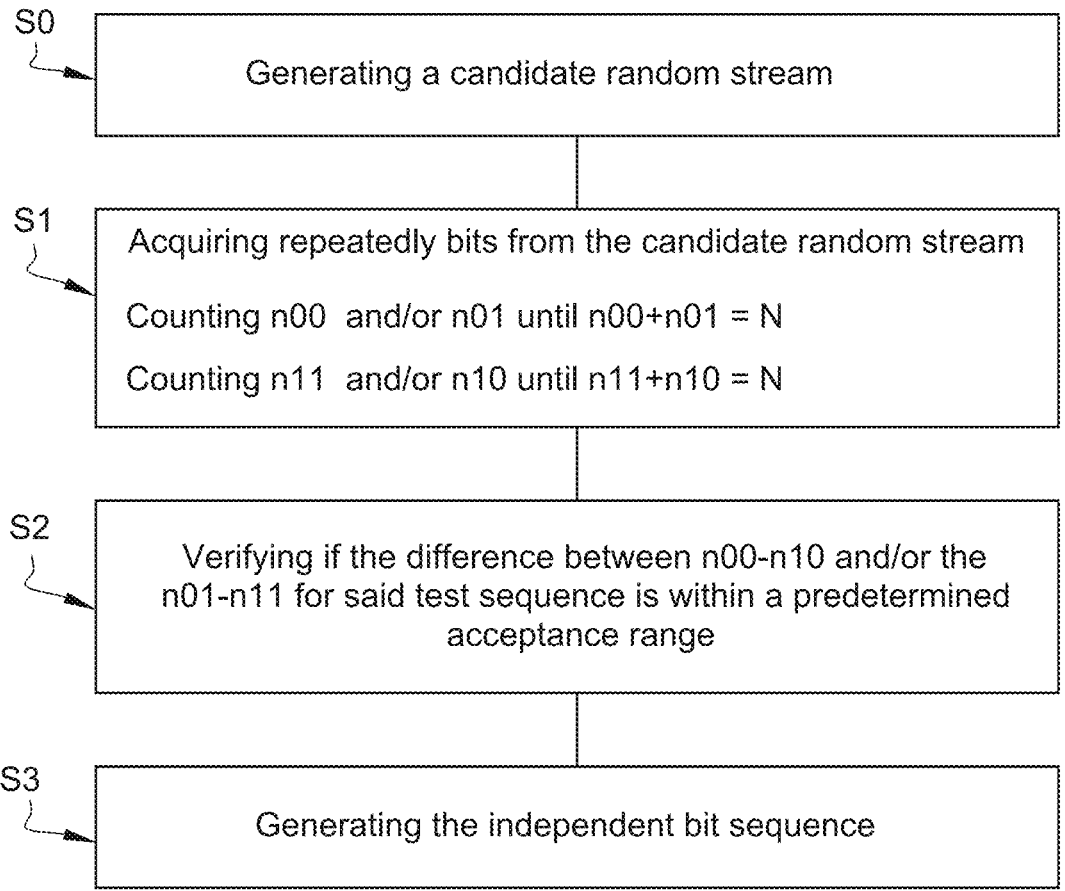

S0 — Generating a candidate random stream

S1 — Acquiring repeatedly bits from the candidate random stream

Counting n00 and/or n01 until n00+n01 = N

Counting n11 and/or n10 until n11+n10 = N

S2 — Verifying if the difference between n00-n10 and/or the n01-n11 for said test sequence is within a predetermined acceptance range S3 — Generating the independent bit sequence

Fig. 4

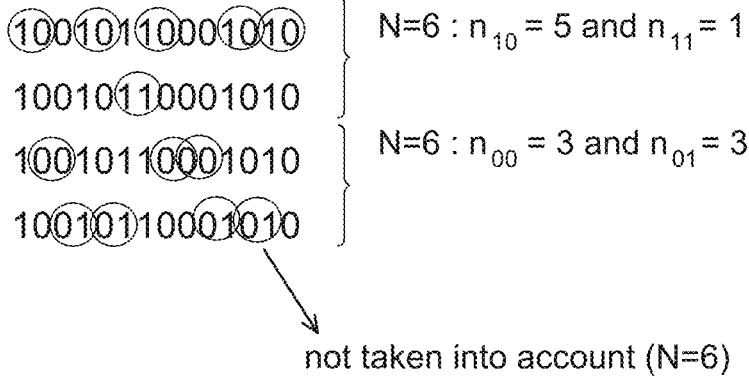

$N=6 : n_{10} = 5$ and $n_{11} = 1$ $N=6 : n_{00} = 3$ and $n_{01} = 3$ not taken into account (N=6)

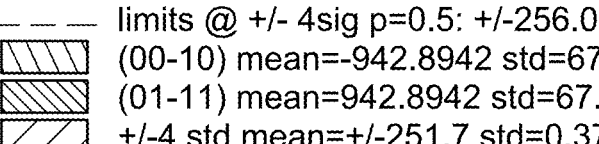
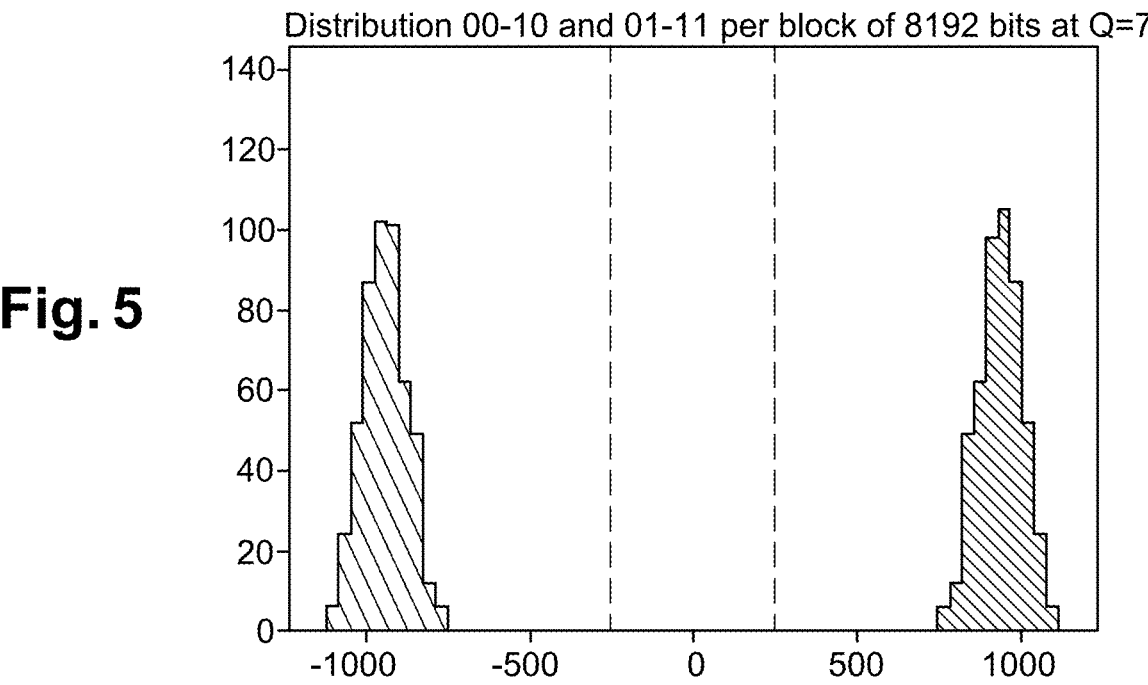
Fig. 5
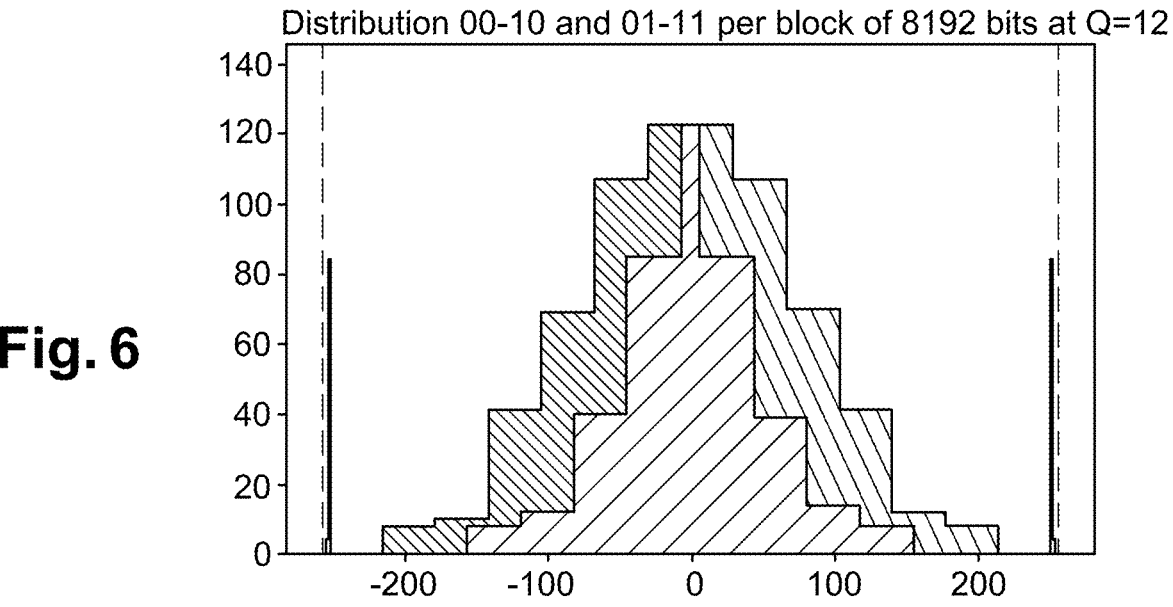
Fig. 6

METHOD FOR GENERATING AN INDEPENDENT BIT SEQUENCE

FIELD

The invention relates to the field of random number generator, and more particularly to a method for ensuring the independency of the bits of a binary random sequence.

BACKGROUND

Random numbers are needed for securely performing many sensitive operations, such as for masking sensitive data in a cryptographic operation. Pseudo Random Number Generators (PRNG) or Physical True Random Number Generators (PTRNG) may be used to generate such random numbers. The random numbers produced by such generators should be truly unpredictable otherwise an attacker could guess the next value produced by such a generator and remove the protection provided by the usage of a random number.

In order to be unpredictable the output stream of a PTRNG should be as close as possible to an independent and identically distributed (IID) distribution. The biais of such an output stream should be minimal: in case of a binary stream, the proportion of 0 and 1 in the output stream should be the same. Such a property is easy to verify by checking in a long stream that the proportion of 0 or 1 is within a predetermined range around 0.5.

Another property to be verified is the independency of the bits of the stream one to another. The probability for a given bit in the stream to be equal to 0 or 1 should not depend on the values taken by previous bits in the stream. Properly testing the independency of an output stream of a random generator often requires storing a long random sequence on which an independency test is run, such as a test based on autocorrelation of the sequence. Therefore, such tests cannot be performed online, on-the-fly on the output stream by the RNG itself, but are rather a posteriori tests to be performed by a computing device with bigger computing and storage means such as a computer.

Lighter, on-the-fly, tests exist, such as tests checking for abusive repetitions of a given value within the random sequence in a timeframe, but they have a much larger false negative rate.

Therefore, there is a need for a method, able to be performed on-the-fly on an output stream of a random generator, and enabling to accurately verify the independency of the bits of the output stream.

SUMMARY

The invention aims at solving the above mentioned technical problem.

For this purpose and according to a first aspect, this invention therefore relates to a method for generating, by a random number generator of a cryptographic system, an independent bit sequence from a binary candidate random stream, said random generator comprising a source of randomness configured to generate a random noise, an analog to digital converter configured to generate a binary raw random stream by digitizing said random noise, said candidate random stream being obtained from said raw random stream, said method comprising:

performing a test to check the independency of the bits of the binary candidate random stream, comprising acquiring repeatedly, at least one bit from the candidate random stream until said acquired bits form a test sequence comprising at least N first pairs of successive bits, wherein the value of a first bit of each of said first pairs is 0, and N second pairs of successive bits, wherein the value of a first bit of each of said second pairs is 1, N being a predetermined integer, and counting in said test sequence a number of pairs of successive bits comprising 0 as both first and second bit, called "n00", and/or a number of pairs of successive bits comprising 0 as first bit and 1 as second bit, called "n01", until n00+n01=N, and counting in said test sequence a number of pairs of successive bits comprising 1 as both first and second bit, called "n11", and/or a number of pairs of successive bits comprising 1 as first bit and 0 as second bit, called "n10", until n11+n10=N, verifying if the difference between "n00" and "n10" and/or the difference between "n01" and "n11" for said test sequence is within a predetermined acceptance range, if verification is a success, generating the independent bit sequence from said candidate random stream.

By doing so, it is verified, with a very limited amount of calculation, if the distributions of bit pairs in the candidate random stream are characteristic of a binary sequence in which bits are independent one from each other.

The predetermined acceptance range may be based on a standard deviation a of a Gaussian distribution centered on 0 followed by a difference, in a sequence of independent bits, between a number of pairs of successive bits comprising 0 as both first and second bit, and a number of pairs of successive bits comprising 1 as first bit and 0 as second bit, and said standard deviation $\sigma$ may be equal to $\sqrt{(2\ pqN)}$, with p and q the probability for a bit of the binary candidate random stream of being equal to respectively 0 and 1.

The predetermined acceptance range may correspond to a predetermined confidence interval of said Gaussian distribution.

Such an acceptance range enables to have a chosen probability of false negative in the verification of the independency of the bits of the candidate random stream.

The method according to the first aspect may comprise a step of configuring said random number generator with a given value of a configuration parameter on which a level of independency of bits of said candidate random stream depends, and generating said candidate random stream depending on said configuration parameter, and may comprise, repeatedly performing, until verification is a success:

if verification is a failure for said candidate random stream obtained using said given value of said configuration parameter, generating a new binary candidate random stream from an output of said analog to digital converter using a new value of said configuration parameter defined by increasing or decreasing by a predetermined step the given value of the configuration parameter, and generating the independent bit sequence from said new binary candidate random stream according to the method according to the first aspect.

Repeatedly adapting the value of the configuration parameter enables to further increase the independence of the bits of candidate random stream when the independence verification has failed for a previous candidate random stream.

In an embodiment, said candidate random stream is obtained by under-sampling said raw random stream and the configuration parameter is an under-sampling factor used for performing said under-sampling.

Such an undersampling enables to increase the independence of the bits of the candidate random stream.

According to a second aspect, the invention relates to cryptographic system comprising a random number generator, said random number generator comprising a source of randomness configured to generate a random noise and an analog to digital converter configured to generate a binary raw random stream by digitizing the random noise generated by the source of randomness, said random number generator being configured to perform the steps of the method according to the first aspect for generating an independent bit sequence from a binary candidate random stream, said candidate random stream being obtained from said raw random stream.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 3 is a schematic illustration of a method for generating an independent bit sequence according to an embodiment of the present invention;

FIG. 4 depicts schematically an example of implementation of testing step of the method for generating an independent bit sequence according to an embodiment of the present invention;

FIG. 5 is a schematic illustration of distributions of n00-n10 and n01-n11 values each obtained for a different candidate random stream, where each candidate random stream has been generated using an undersampling factor Q=7;

FIG. 6 is a schematic illustration of distributions for n00-n10 and n01-n11 values obtained for candidate random streams generated using an undersampling factor Q=12.

DETAILED DESCRIPTION OF EMBODIMENTS OF THE INVENTION

Figures 1, 2:
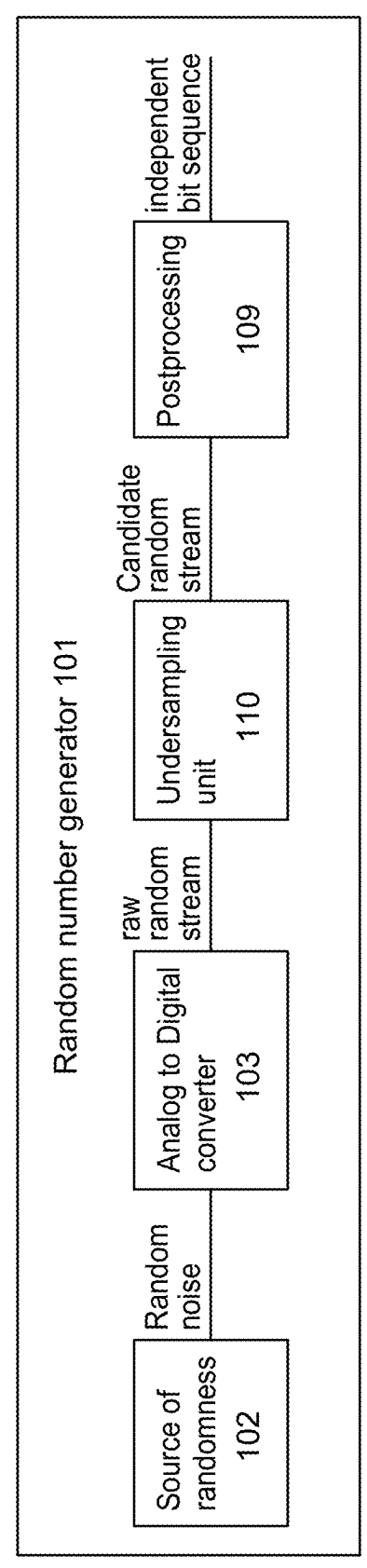
FIG. 1 depicts schematically an example of a random number generator of a cryptographic system according to the present invention.
FIG. 2 depicts schematically an example of a cryptographic system according to the present invention.

The invention aims at generating by a random number generator a bit sequence whose bits can be considered as sufficiently independent, hereafter called independent bit sequence, so that an attacker cannot guess the value of future bits outputted by the random number generator from already outputted bits.

As shown on FIG. 1, a cryptographic system 100 comprises a random number generator 101 in charge of producing such an independent bit sequence. The random number generator 101 comprises a source of randomness 102 generating a random noise. Such a source of randomness may for example be the thermal noise of a component, the jitter of an oscillator, the metastability of a flip-flop . . . . The random number generator 101 also comprises an analog to digital converter 103, such as a time to digital unit, configured to generate a binary raw random stream by digitizing the random noise generated by the source of randomness.

As shown on FIG. 2, the cryptographic system also comprises at least one memory, such as a Non Volatile memory 104, a RAM memory 105 and/or a ROM memory 106. The cryptographic system 100 may further include a communication interface 107 by which the cryptographic system 100 may be connected to a network. Such an interface may be a wireless interface connected to an antenna and may be used to connect the cryptographic system 100 to various forms of wireless networks, e.g., wide-area networks, WiFi networks, or mobile telephony networks. Alternatively, such an interface may be a wired interface such as an Ethernet one. The cryptographic system 100 may also include input/output means 108 providing interfaces to a user of the first device, such as one or more screens, loudspeakers, a mouse, tactile surfaces, a keyboard etc.

Such a cryptographic system may for example be a tamperproof smartcard, a hardware security module HSM, a personal computer, a server or a smartphone.

In order to determine if an independent bit sequence can be outputted by the random number generator from this raw random stream, a candidate random stream is generated from the raw random stream and the independency of the bits of this candidate random stream one from each other shall be tested. If the candidate raw random stream passes such an independency test, some additional post-processing may be applied to the candidate random stream by a post-processing unit 109 of the cryptographic system for generating the independent bit sequence considered as the output of the random number generator.

In binary sequences outputted by such a digitized source of randomness, the correlation between the value of a given bit and the values of a few preceding bits is often too strong to consider the bits of such a sequence as sufficiently independent one from each other. Therefore, a first main idea of the invention is that the cryptographic system 100 shall include means to adjust a level of independence of the bits of a candidate random stream depending on a configuration parameter Q. For example, it may comprise an undersampling unit 110, configured to generate the candidate random stream by performing an under-sampling, by a factor Q with Q an integer, of the raw random stream outputted by the analog to digital converter.

A second main idea of the invention is to consider that if the bits of a binary stream are truly independent, the random variables n00-n10 and n11-n01, with nij the number of (i,j) pairs in a binary sequence of length N from this stream, should follow a Gaussian distribution centered on 0, with a standard deviation equal to $\sqrt{2pqN}$ with p and q respectively the probabilities that a given bit is equal to 0 or 1. Therefore, it is possible to choose a bilateral confidence interval of a normal distribution and to decide that the value n00-n10 or n11-n01 does not follow a Gaussian distribution when it falls out of the chosen confidence interval. For example, the probability that a sample of a random variable following a normal law falls out of the interval +/−3 sigma (σ), with sigma (σ) the standard deviation of this normal law, is only 0.3%; therefore if the value n00-n10 or n11-n01 is out of the +/−3 sigma (σ) interval, one could consider that it probably doesn't follow a normal law and therefore that the bits of the candidate random stream are not independent enough.

A last main idea of the invention is that when a candidate random stream, obtained using a given value of the configuration parameter Q, fails the independency test based on the value of n00-n10 or n11-n01, a new candidate random stream can be generated from another raw random stream of the same source of randomness but with a higher independency between two successive bits by applying a different value of the configuration parameter Q. For example, the undersampling factor could be increased. The configuration parameter may be increased or decreased over and over again until a candidate random stream passes the independency test based on the value of n00-n10 or n11-n01.

The following paragraphs describe with more details the steps performed by the method according to the invention for generating an independent bit sequence from a raw random stream outputted by the analog to digital converter 103, as shown on FIG. 3.

In an initialization step S0, the random number generator generates a candidate random stream whose bits independence is to be tested.

In a first testing step S1, the random number generator acquires repeatedly at least one bit from the candidate random stream until said acquired bits form a test sequence comprising at least N first pairs of successive bits, wherein the value of a first bit of each of said first pairs is 0, and N second pairs of successive bits, wherein the value of a first bit of each of said second pairs is 1, N being a predetermined integer. Said differently, the acquired stream should be long enough to contain at least N bits equal to 0 followed by either 0 or 1, forming the N first pairs (0,0) or (0,1), and N bits equal to 1 followed by either 0 or 1 forming the N second pairs (1,0) or (1,1).

In the same step, the random number generator counts, in the test sequence, the number of pairs of successive bits comprising 0 as both first and second bit, called "n00", and/or the number of pairs of successive bits comprising 0 as first bit and 1 as second bit, called "n01", until the sum of said numbers equals to N: n00+n01=N. Since each bit can only be equal to 0 or 1, each bit equal to 0, except the last bit of the sequence, is either followed by a 0 or a 1. The random number generator may go through the bits of the test sequence from the beginning and for each bit equal to 0 increase either n00 or n01, depending on the value of the next bit, until n00+n01=N. In case the test sequence contains more than N first pairs (0,0) or (0,1), the additional pairs in excess of N are not taken into account in the determination of n00 and n01.

Similarly, in this step, the random number generator counts in the test sequence the number of pairs of successive bits comprising 1 as both first and second bit, called "n11", and/or the number of pairs of successive bits comprising 1 as first bit and 0 as second bit, called "n10", until the sum of said numbers equals to N: n11+n10=N. Since each bit can only be equal to 0 or 1, each bit equal to 1, except the last bit of the sequence, is either followed by a 0 or a 1. The random number generator may go through the bits of the test sequence from the beginning and for each bit equal to 1 increase either n11 or n10, depending on the value of the next bit, until n11+n10=N. In case the test sequence contains more than N first pairs (1,0) or (1,1), the additional pairs in excess of N are not taken into account in the determination of n10 and n11.

When bits are acquired one by one from the candidate random stream, counters may be used to store the values n00, n01, n10 and n11 and one of the counters may be incremented each time a bit is acquired (except for the first bit), depending on the value of the pair formed by the acquired bit and the previous acquired bit. By doing so, there is no need to store the whole test sequence before starting to count the numbers of pairs of each type. Such a counting can be performed on-the-fly. on the bits acquired from the candidate random stream.

An example is given on FIG. 4 for N=6 and a test sequence equal to 10010110001010. In this example the test sequence contains 5 (1,0) pairs and one (1,1) pair, so that n10=5 and n11=1. It also contains 3 (0,0) pairs so that n00=3. It contains 4 (0,1) pairs but n01 is set to 3 only.

Indeed, when accounting for (0,0) and (0,1) pairs starting from the beginning of the test sequence, after accounting for the third (0,1) pair, n00 and n01 are both equal to 3 and the condition n00+n01=N is already met, leading to the last (0,1) not being accounting for in n01.

In a second testing step S2, the random number generator verifies if the difference between "n00" and "n10" and/or the difference between "n01" and "n11" for the test sequence is within a predetermined acceptance range.

In an embodiment, the predetermined acceptance range is based on a standard deviation σ of a Gaussian distribution centered on 0 followed by a difference, in a sequence of independent bits, between a number of pairs of successive bits comprising 0 as both first and second bit, and a number of pairs of successive bits comprising 1 as first bit and 0 as second bit, wherein said standard deviation σ is equal to $\sqrt{(2 pqN)}$, with p and q the probability for a bit of the binary candidate random stream of being equal to respectively 0 and 1. Said differently, this predetermined acceptance range is based on the standard deviation a of the normal law that would be followed by n00-n10, or n01-n11, if the bits in the candidate random stream were truly independent one from each other, this standard deviation σ being equal to $\sqrt{(2 pqN)}$, with p and q the probability for a bit of the binary candidate random stream of being equal to respectively 0 and 1. Alternatively, a different distribution may be assumed for n00-n10, or n01-n11.

Using such a test, even a test sequence composed only of fully independent bits may fail the test when its value n00-n10, or n01-n11 falls out of the acceptance range. The probability of doing so is 1-p where the acceptance range defines a p-confidence interval of the distribution presumably followed by n00-n10 or n01-n11. In one embodiment, a predetermined value r may be selected for the rate of such false positive detection of a dependent behavior in the test sequence, and the acceptance range may be selected such that r=1-p. For example, in the case of a Gaussian distribution, an acceptance range of +/−1*σ corresponds to a ~68% confidence interval and a rate of false positive of ~32%, an acceptance range of +/−2*σ corresponds to a ~95% confidence interval and a rate of false positive of ~5%, an acceptance range of +/−3*σ corresponds to a ~99.7% confidence interval and a rate of false positive of ~0.3%, and an acceptance range of +/−4*σ corresponds to a ~99.99% confidence interval and a rate of false positive of ~0.01%.

Alternatively, in the case of a non-parametric distribution where the bounds of a given confidence interval are not known, Monte Carlo simulation may be performed using a PRNG, to get distributions for the values n00-n10 and/or n01-n11. The predetermined acceptance range may be selected as the confidence interval at x % of these distributions with x a predetermined value.

In a generation step S3, if verification has been a success in the second testing step S2, the random number generator generates the independent bit sequence from the candidate random stream. The candidate random stream may be directly outputted as the independent bit sequence, without any modification. Alternatively, some additional post-processing, such as post-processing defined in NIST Special Publication 800-90A Revision 1, may be applied to the candidate random stream by the post-processing unit 109 of the cryptographic system for generating the independent bit sequence considered as the output of the random number generator.

In the initialization step S0, the random number generator generates the candidate random stream. At this step, a given value may be selected for a configuration parameter Q of the random number generator, the independence level of the bits of the candidate random stream depending on this configuration parameter, and the random number generator is configured using this value of the configuration parameter.

In a first embodiment, at this initialization step S0, the candidate random stream is obtained by under-sampling the raw random stream and the configuration parameter Q is the under-sampling factor used for performing said under-sampling, with Q a non-zero integer. Such an undersampling increases the distance in the raw random stream of two successive bits of the candidate random stream. Therefore, it is likely to decrease the dependency between such two successive bits.

In a second embodiment, the source of randomness of the random number generator comprises a ring of oscillators (as described for example in the publication "A Provably secure True Random Number Generator with Built-in Tolerance to Active Attacks", B. Sunar, W. J. Martin, D. R. Stinson) and the configuration parameter Q is the number of oscillators used in said ring for producing the raw random stream.

At the second testing step S2, if verification has been a failure for the candidate random stream obtained using said given value of the configuration parameter Q, the generation of the independent bit sequence may be retried with a different value of the configuration parameter increasing the level of independency of the bits of the candidate random stream. In order to do so, the random number generator may generate a new binary candidate random stream using a new value of the configuration parameter Qnew defined by increasing by a predetermined step the given value of the configuration parameter Q used for generating the previous candidate random stream. As an example, the random number generator may increase the under-sampling factor in order to apply a stronger under-sampling, or it may increase the number of different oscillators used to generate the candidate random stream. The random number generator may then retry to generate the independent bit sequence from this new binary candidate random stream by applying again the steps S1 to S3 to this new binary candidate random stream.

Such an increase of the configuration parameter, regeneration of a new candidate random stream and testing of the candidate random stream may be performed repeatedly until the verification of the second testing step S2 is a success. Alternatively, it may stop if the configuration parameter has reached a predetermined threshold and verification at the second testing step has still failed.

Some action, such as issuing an alarm, may be performed each time a verification at the fourth testing step fails and/or each time the configuration parameter reaches predetermined values.

As an example, for N=8192, and p=q=0.5 the threshold $4*\sigma$ is equal to 251.7 with $\sigma=\sqrt{2}$ pqN. FIG. 5 shows the distributions of n00-n10 and n01-n11 values each obtained for a different candidate random stream, where each candidate random stream has been generated using an undersampling factor Q=7. All values are far out of the $+/-4*\sigma$ acceptance range with a mean value of $+/-943$. On the other hand, FIG. 6 shows similar distributions for n00-n10 and n01-n11 values obtained for candidate random streams generated using an undersampling factor Q=12. This time all values are in the $+/-4*\sigma$ acceptance range with a mean value of $+/-28$.

According to a second aspect, the invention relates to cryptographic system 100 comprising a random number generator 101, said random number generator comprising a source of randomness 102 configured to generate a random noise and an analog to digital converter 103 configured to generate a binary raw random stream by digitizing the random noise generated by the source of randomness, said random number generator being configured to perform the steps of the method described here above for generating an independent bit sequence from a binary candidate random stream, said candidate random stream being obtained from said raw random stream.

The invention claimed is:

1. A method for generating, by a random number generator of a cryptographic system, an independent bit sequence from a binary candidate random stream, said random number generator comprising a source of randomness configured to generate a random noise, an analog to digital converter configured to generate a binary raw random stream by digitizing said random noise, said candidate random stream being obtained from said raw random stream, said method comprising:

performing a test to check the independency of the bits of the binary candidate random stream, comprising:

acquiring repeatedly (S1) at least one bit from the candidate random stream until said acquired bits form a test sequence comprising at least N first pairs of successive bits, wherein the value of a first bit of each of said first pairs is 0, and N second pairs of successive bits, wherein the value of a first bit of each of said second pairs is 1, N being a predetermined integer, and counting in said test sequence a number of pairs of successive bits comprising 0 as both first and second bit, called "n00", and/or a number of pairs of successive bits comprising 0 as first bit and 1 as second bit, called "n01", until n00+n01=N, and counting in said test sequence a number of pairs of successive bits comprising 1 as both first and second bit, called "n11", and/or a number of pairs of successive bits comprising 1 as first bit and 0 as second bit, called "n10", until n11+n10=N, verifying (S2) if the difference between "n00" and "n10" and/or the difference between "n01" and "n11" for said test sequence is within a predetermined acceptance range, if verification is a success, generating (S3) the independent bit sequence from said candidate random stream, wherein a difference, in a sequence of independent bits, between a number of pairs of successive bits comprising 0 as both first and second bit, and a number of pairs of successive bits comprising 1 as first bit and 0 as second bit follows a predetermined distribution and the acceptance range is set to have a chosen probability of false negative for the predetermined distribution in the verification of the independency of the bits of the candidate random stream.

2. The method of claim 1, wherein the predetermined acceptance range is based on a standard deviation $\sigma$ of a Gaussian distribution centered on 0 followed by a difference, in a sequence of independent bits, between a number of pairs of successive bits comprising 0 as both first and second bit, and a number of pairs of successive bits comprising 1 as first bit and 0 as second bit, wherein said standard deviation $\sigma$ is equal to $\sqrt{(2pqN)}$, with p and q the probability for a bit of the binary candidate random stream of being equal to respectively 0 and 1.

3. The method of claim 2, wherein the predetermined acceptance range corresponds to a predetermined confidence interval of said Gaussian distribution.

4. The method of claim 1, comprising a step (S0) of configuring said random number generator with a given value of a configuration parameter (Q) on which a level of independency of bits of said candidate random stream depends, and generating said candidate random stream depending on said configuration parameter, and comprising, repeatedly performing, until verification is a success:

if verification is a failure for said candidate random stream obtained using said given value of said configuration parameter (Q), generating a new binary candidate random stream from an output of said analog to digital converter using a new value of said configuration parameter (Qnew) defined by increasing or decreasing by a predetermined step the given value of the configuration parameter (Q), and generating the independent bit sequence from said new binary candidate random stream, including performing said test to check the independency of the bits of the new binary candidate random stream.

5. The method of claim 4, wherein said candidate random stream is obtained by under-sampling said raw random stream and the configuration parameter (Q) is an under-sampling factor used for performing said under-sampling.

6. A cryptographic system comprising a random number generator, said random number generator comprising a source of randomness configured to generate a random noise and an analog to digital converter configured to generate a binary raw random stream by digitizing the random noise generated by the source of randomness, said random number generator being configured to perform the steps of the method for generating an independent bit sequence from a binary candidate random stream as follows, said candidate random stream being obtained from said raw random stream, performing a test to check the independency of the bits of the binary candidate random stream, comprising:

acquiring repeatedly (S1) at least one bit from the candidate random stream until said acquired bits form a test sequence comprising at least N first pairs of successive bits, wherein the value of a first bit of each of said first pairs is 0, and N second pairs of successive bits, wherein the value of a first bit of each of said second pairs is 1, N being a predetermined integer, and counting in said test sequence a number of pairs of successive bits comprising 0 as both first and second bit, called "n00", and/or a number of pairs of successive bits comprising 0 as first bit and 1 as second bit, called "n01", until n00+n01=N, and counting in said test sequence a number of pairs of successive bits comprising 1 as both first and second bit, called "n11", and/or a number of pairs of successive bits comprising 1 as first bit and 0 as second bit, called "n10", until n11+n10=N, verifying (S2) if the difference between "n00" and "n10" and/or the difference between "n01" and "n11" for said test sequence is within a predetermined acceptance range, if verification is a success, generating (S3) the independent bit sequence from said candidate random stream, wherein a difference, in a sequence of independent bits, between a number of pairs of successive bits comprising 0 as both first and second bit, and a number of pairs of successive bits comprising 1 as first bit and 0 as second bit follows a predetermined distribution and the acceptance range is set to have a chosen probability of false negative for the predetermined distribution in the verification of the independency of the bits of the candidate random stream.

* * * * *